US009057181B2

(12) United States Patent
Brody

(10) Patent No.: US 9,057,181 B2
(45) Date of Patent: Jun. 16, 2015

(54) WATER FLOW VALVE FOR IMPROVING ACCURACY OF METER READINGS IN COMMUNICATION WITH A WATER DISTRIBUTION SYSTEM

(71) Applicant: FLUID DYNAMICS HOLDINGS, LLC, Miami, FL (US)

(72) Inventor: Efraim Brody, Miami, FL (US)

(73) Assignee: FLUID DYNAMICS HOLDINGS, LLC, Miami, FL (US)

( * ) Notice: Subject to any disclaimer, the term of this patent is extended or adjusted under 35 U.S.C. 154(b) by 0 days.

(21) Appl. No.: 13/673,777

(22) Filed: Nov. 9, 2012

(65) Prior Publication Data
US 2014/0130873 A1 May 15, 2014

(51) Int. Cl.
| F16K 15/06 | (2006.01) |
| E03B 1/04 | (2006.01) |
| G01F 15/00 | (2006.01) |
| E03B 7/07 | (2006.01) |

(52) U.S. Cl.
CPC . *E03B 1/04* (2013.01); *E03B 7/075* (2013.01); *G01F 15/005* (2013.01); *F16K 15/06* (2013.01)

(58) Field of Classification Search
CPC ....... F16K 15/06; E03B 7/075; A01B 12/006; G01F 15/005
USPC ................ 137/12, 528, 454.2, 469, 514, 533, 137/533.21, 533.25, 533.31; 251/64; 73/1.72, 239, 861.52, 862.582
See application file for complete search history.

(56) References Cited

U.S. PATENT DOCUMENTS

| 4,091,838 | A | * | 5/1978 | Dowty et al. | 137/528 |
| 4,930,539 | A | * | 6/1990 | van Rooy | 137/514 |
| 5,806,558 | A | | 9/1998 | Greverath | |
| 5,921,275 | A | | 7/1999 | Knop et al. | |
| 7,431,048 | B2 | * | 10/2008 | Fangmeier | 137/542 |
| 8,408,244 | B2 | * | 4/2013 | Gilcher | 137/511 |
| 2006/0042399 | A1 | | 3/2006 | Hughes et al. | |
| 2006/0260463 | A1 | * | 11/2006 | Wegkamp | 92/88 |
| 2009/0193908 | A1 | * | 8/2009 | Dana | 73/861.08 |
| 2010/0044606 | A1 | | 2/2010 | Moench et al. | |

FOREIGN PATENT DOCUMENTS

RU 2462637 C2 9/2012

OTHER PUBLICATIONS

International Search Report and Written Opinion from PCT International Searching Authority dated Dec. 12, 2013 (7 pages)—Authorized Officer E. Goryuniva.

* cited by examiner

*Primary Examiner* — Kevin Lee
*Assistant Examiner* — P. Macade Nichols
(74) *Attorney, Agent, or Firm* — Daniel S. Polley, P.A.

(57) ABSTRACT

A water flow valve positioned within a water distribution system just past a building's water meter. The valve compresses air bubbles into the water at the point where the water enters the meter, thus making the meter read less volume when the water passes through it. The air is compressed through back pressure created by the valve. With this increase in pressure, the air bubbles in the water begin to collapse and occupy less space. When the water, with collapsed air bubbles, passes through the meter, the meter reads basically only the water volume, as the amount of any air volume remaining is negligible. As such, the user's water bill is lower, as compared to if no valve had been disposed within the water line, and the bill reflect a more accurate reading of the actual amount of water that has been delivered.

22 Claims, 14 Drawing Sheets

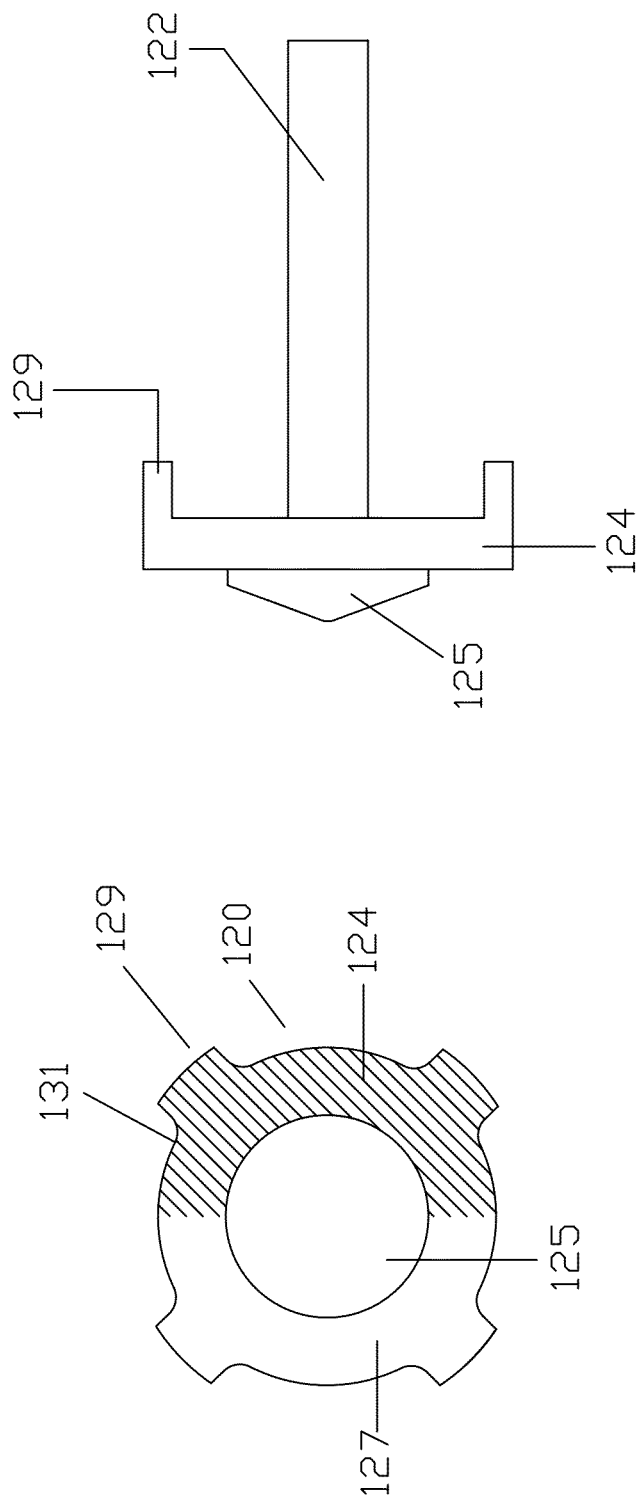

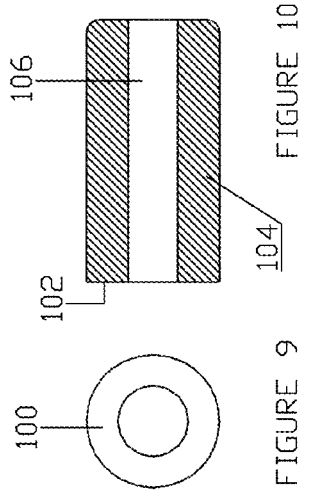
FIGURE 9
FIGURE 10
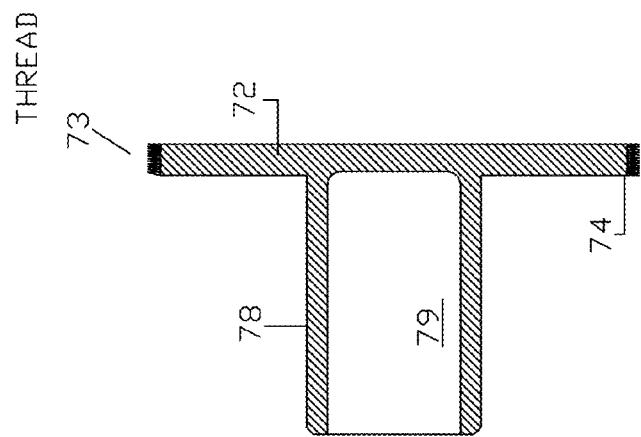
FIGURE 8
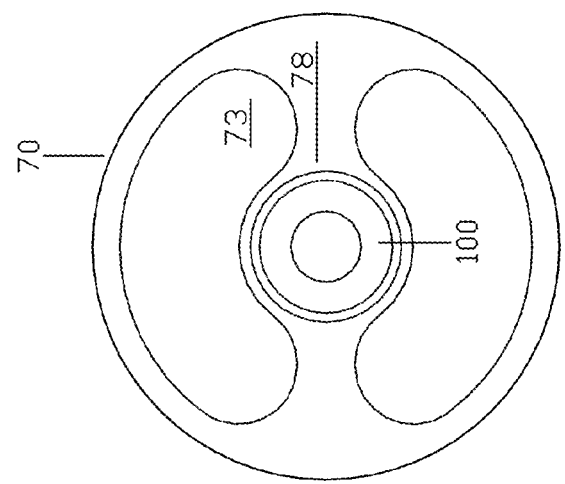
FIGURE 7

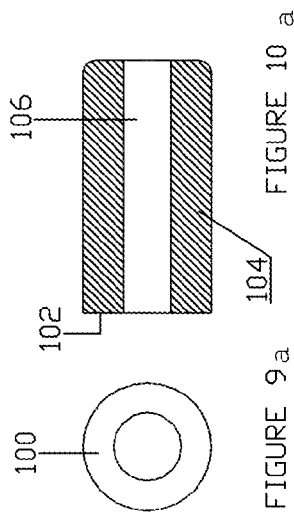
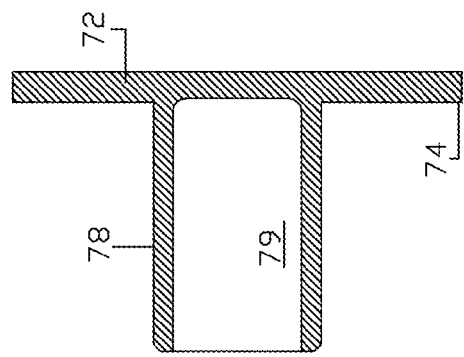
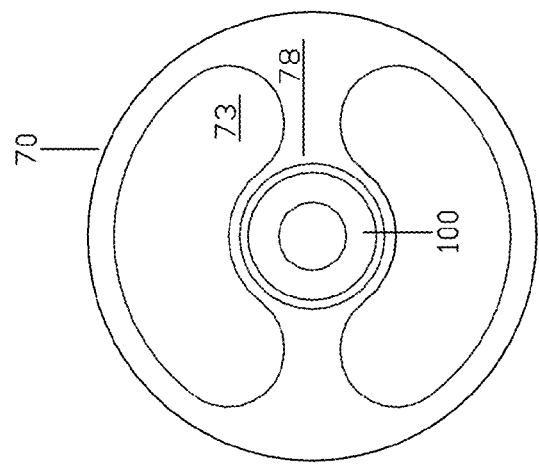

FIGURE 13 "CLOSED"

"OPEN"

WATER FLOW VALVE FOR IMPROVING ACCURACY OF METER READINGS IN COMMUNICATION WITH A WATER DISTRIBUTION SYSTEM

FIELD OF THE INVENTION

The present invention relates generally to the measurement of water delivered to a dwelling through water distribution systems and particular to a water flow valve disposed within the water distribution system for improving the accuracy of the water meter readings.

BACKGROUND OF THE INVENTION

Water distribution systems are known to contain inefficiencies that can impact the accuracy of the meter readings associated with the water distribution system. One inefficiency with current water distribution systems is that in addition to measuring water passing through, the water meters also measure any was that passes through with the water. It is known that when water travels from the city supply to a residence or other building it carries air with it. When water passes through a water meter associated with the residence/building, the meter reads the volume of water passing through the meter. This includes the air passing through with the water. This results in the consumer (homeowner, business owner, etc.) being charged and paying for both the water and the air measured by the meters. Accordingly, conventional water meters indicate a higher amount of volume of water than what is actually received by the consumer, which results in the consumer being charged more than they should owe. It is to the effective resolution of the above-identified problem that the present invention is directed.

SUMMARY OF THE INVENTION

The present invention relates generally to a water flow valve installed within a water distribution system at a point in the water distribution between the water meter and the dwelling to which the water meter is associated with. The water flow valve is preferably positioned just after the water meter between the meter and the building that the meter is associated with. In use, the valve compresses the air into the water at the point where the water enter the meters, thus making the meter read less volume when the water passes through it. The air is compressed through the creation by the valve of back pressure in the water line of the water distribution system. With this increase pressure, the air molecules in the water begin to collapse and occupy less space. When the water, with collapsed air bubbles, passes through the meter, the meter detects or reads basically only the water volume and virtually ignores any small or trivial amount of air volume that may remain in the water. Thus, the water bill generated from readings by the meter will be lower, as compared to if the present invention valve had not been disposed within the water distribution system. With the present invention valve positioned in the water distribution system, the water bill received by the building owner reflects a much more accurate reading of the actual amount of water that has been delivered to the building/dwelling.

The water flow valve preferably consists of a body member defining an internal passageway from a first end to a second end. The internal passageway has two portions of differing diameters. The diameter of the first portion of the passageway, which is associated with the water inlet end of the of the valve body, is preferably smaller than the diameter of the second portion of the passageway. The differing diameters create a ledge at the point inside valve body where the first passageway portion meets the second passageway portion. A movable member is disposed within the body member which determines when valve is in a closed or open position. The movable member preferably comprises a ring member which is attached in a fixed position adjacent to the second outlet end of the body member and an impeller member. The ring member includes a housing portion which contains a bushing/plug member therein. The impeller member includes an impeller head and a shaft member. A portion of the shaft member is received within housing portion of the ring member and in a snug relationship with the plug member disposed within the housing portion. The amount of water pressure (i.e. how fast or slow the water travels in the water distribution system) will determine how tight or loose to make the snug relationship between the plug member and the shaft member. The less snug/tight the relationship, the easier the shaft member will move towards the second end of the valve body, to open the valve.

In the valve "closed" position, the impeller head contacts and is positioned against the internal ledge in the valve body. When water travels through water distribution system at a pressure higher than the pressure set from the relationship between the shaft member and the plug member, the contacting of the water against the impeller head, causes the shaft member and the attached impeller head to move towards the second outlet end of the valve body. Thus, the impeller head is no longer positioned against the ledge, causing, the valve to be in an "opened" position which permits the water to continue to travel through and out of the valve body to its ultimate destination (i.e. the building, etc). The contacting of the water against the impeller head, in the "closed" or "opened" position of the valve, causes and creates the back pressure which is used to collapse the air bubbles at the point in the water distribution system just before the water is read by the associated water meter. Thus, the water reads basically on the volume of water that is passing through, as there is preferably a negligible amount of air in the water at the point the water passes through the meter. This results in the building's owner's water bill to be a much lower amount as compared to if no valve had been positioned just pass the meter in the water distribution system.

BRIEF DESCRIPTION OF THE DRAWINGS

FIG. 3 is a front elevational view of the impeller member of the water flow valve of FIG. 2;

FIG. 4 is a side sectional view of the impeller member of FIG. 3;

FIG. 7 is a top view of the ring member with plug member disposed within;

FIG. 8 is a side sectional view of the ring member of the water flow valve of FIG. 2;

FIG. 9 is a front elevational view of the plug member of the water flow valve of FIG. 2.

FIG. 10 is a side sectional view of the plug member of FIG. 9, with FIGS. 7-10 showing a threaded version;

FIG. 7a is a top view of the ring member with plug member disposed within;

FIG. 8a is a side sectional view of the ring member of the water flow valve of FIG. 2;

FIG. 9a is a front devotional view of the plug member of the water now valve of FIG. 2;

FIG. 10a is a side sectional view of the plug member of FIG. 9, with FIGS. 7a-10a showing an unthreaded (locking ring) version;

DETAILED DESCRIPTION OF THE DRAWINGS

Figure 1:
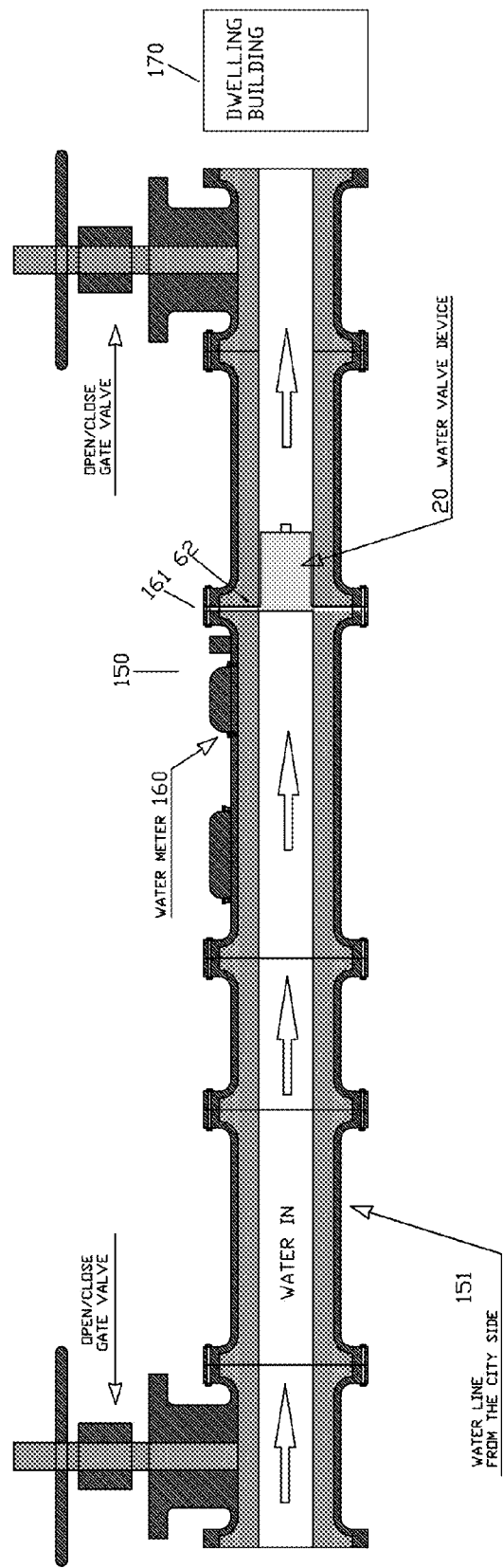
FIG. 1 illustrates the water flow valve of the present invention positioned within a water distribution system near or adjacent to a water meter and between the water meter and the building for which the water meter is associated with for billing purposes.

As seen in the Figures, a water flow valve for installation in a water distribution system for improving water meter reading accuracy is shown and generally designated as valve 20. Valve 20 generally includes a body 40, a ring member 70 secured by body 40, a plug 100 housed within ring member 70 and an impeller member 120 associated with said ring member 70 and movable within body 40 based on the flow of water within a water line 151 of a water distribution system 150. Preferably, water flow valve 20 is disposed within water distribution system 150 between a water meter 160 and a dwelling 170 associated with water meter 160 that receives water from water distribution system 150.

Body 40 has a first end 42, a second end 44 and an outer surface 46. The cross-sectional shape of body 40 can be cylindrical, though such is not considered limiting, and the cross-sectional shape can also be selected according to the cross-sectional shape of the pipe/plumbing used for water line 151 of water distribution system 150. Body 40 defines an internal passageway 48 extending from first end 42 to second end 44. Preferably passageway 48 has a substantially circular cross-sectional shape, though such is not considered limiting and other shapes can be selected and are considered within the scope of the invention. Internal passageway 48 includes a first passageway segment 50 being of a first diameter size and a second passageway segment 52 being of a second diameter size which is greater in size than the first diameter size resulting in an internal ledge 54 being disposed within body 40 where first passageway segment 50 and second passageway segment 52 meet. An internal cutout 56 is also formed in a portion of ledge 54. Preferably, the incoming edge 55 of first passageway segment 50 can be curved, or rounded to aid in directing water from water distribution system 150 into passageway 48.

Figure 2:
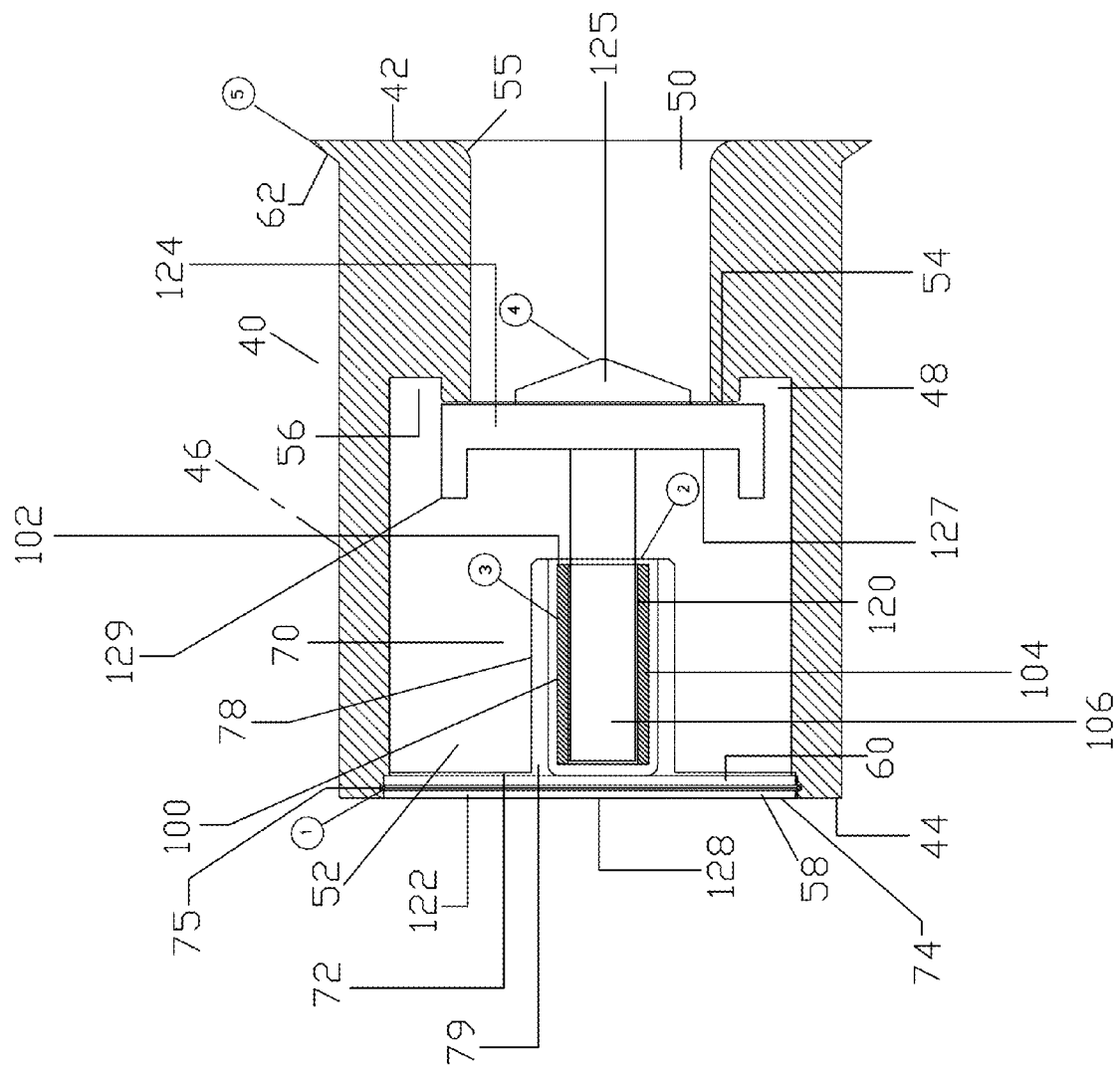
FIG. 2 is a sectional view of the water flow valve in accordance with the present invention and illustrating a locking ring version.
Figure 2A:
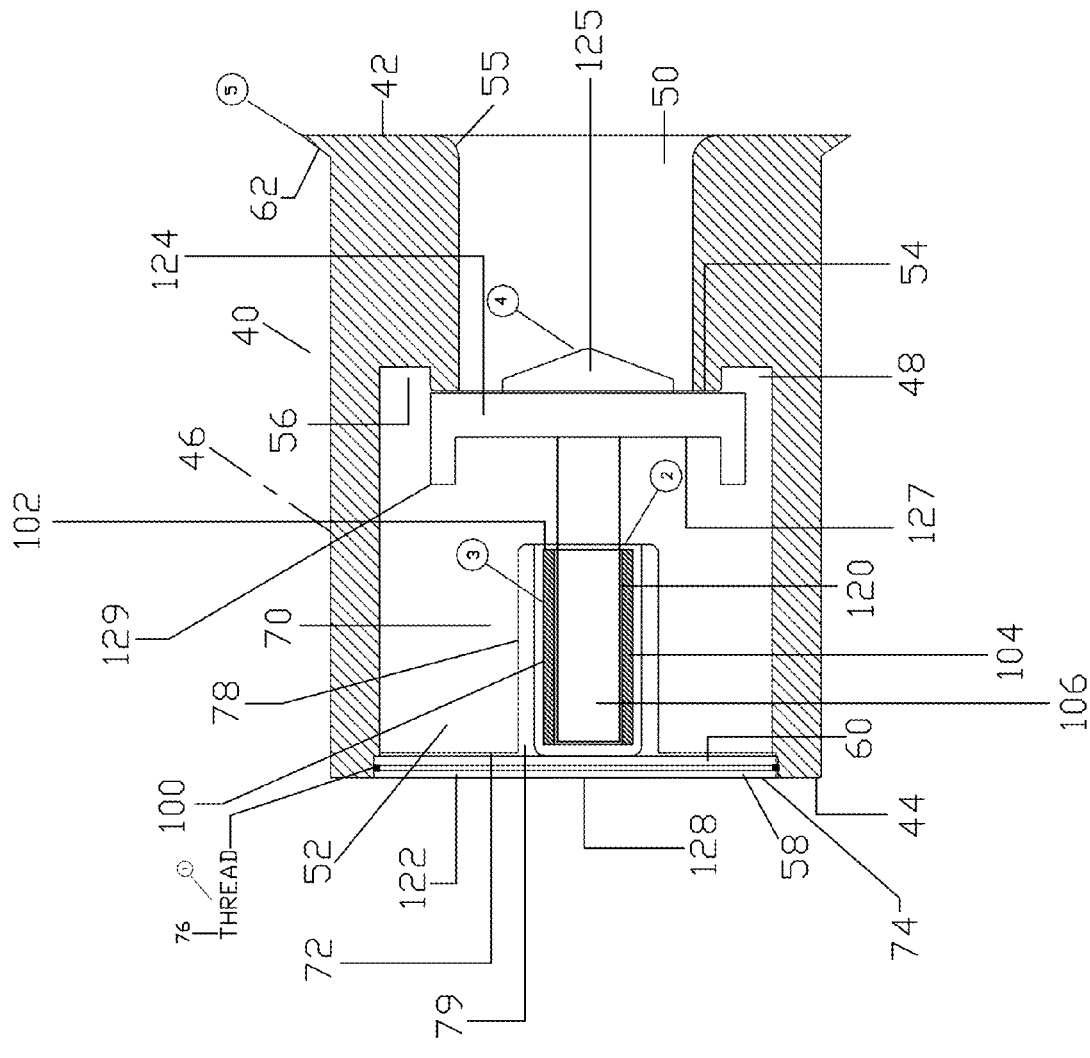
FIG. 2a is a sectional view of the water flow valve in accordance with the present invention and illustrating a thread version.
Figure 11:
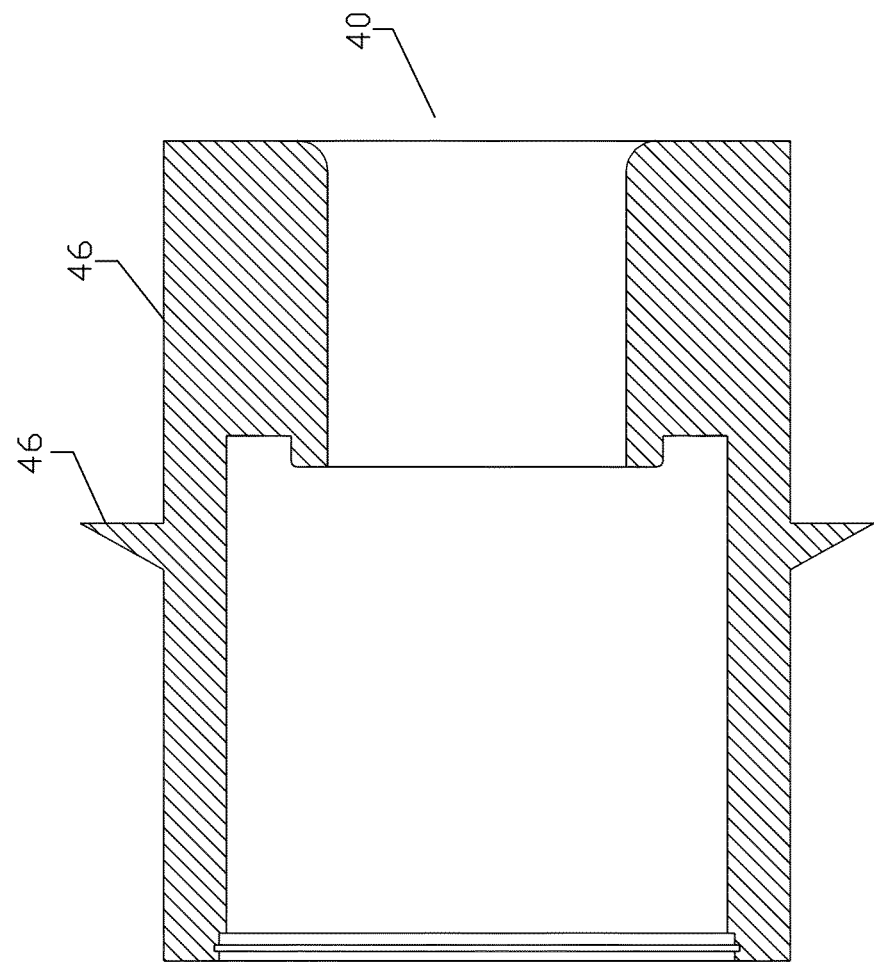
FIGS. 11-12 illustrate the valve body of the water flow valve showing the outer securement flange in two alternative positions, namely, intermediate position (FIG. 11) and back position (FIG. 12) in addition to the front position shown in FIG. 2.
Figure 12:
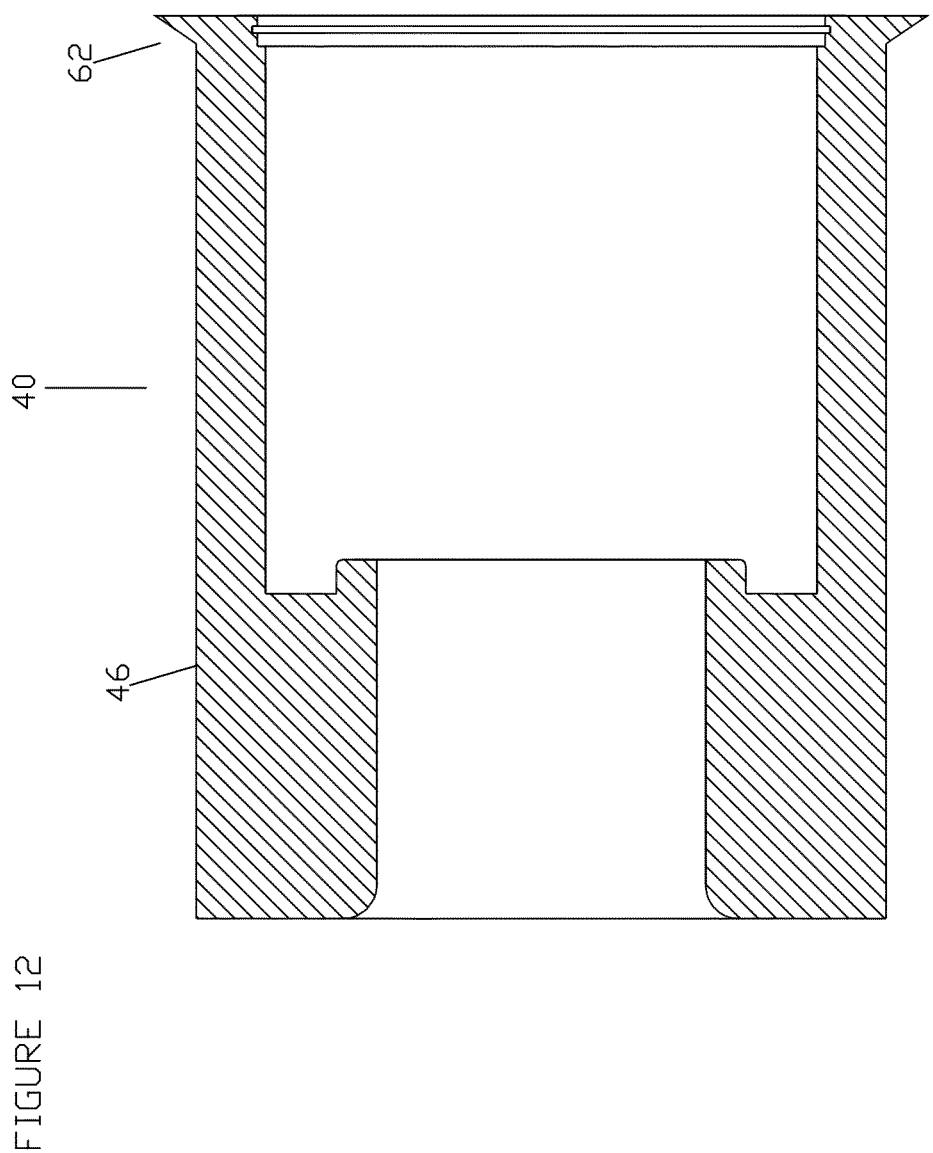
Figure 13:
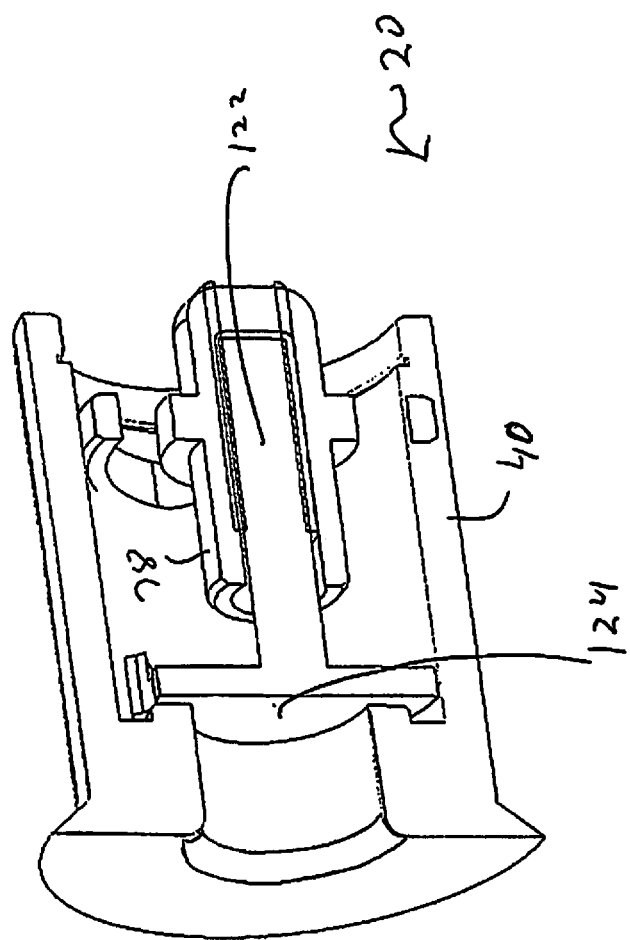
FIGS. 13-16 illustrates several views of the present invention valve shown in sectional and in either a valve "open" or valve "closed" position.
Figure 14:
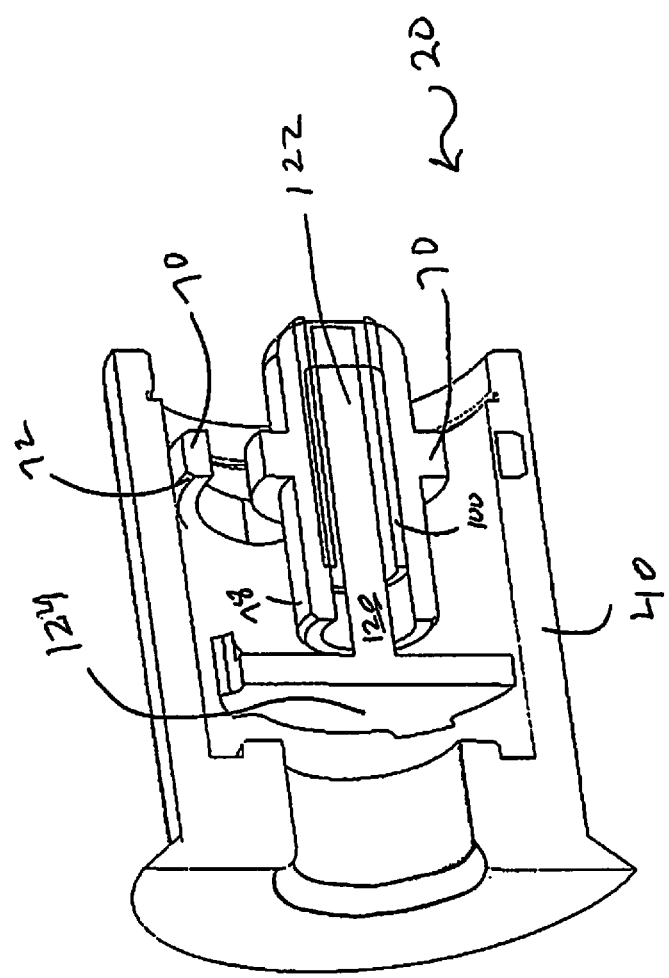
Figure 15:
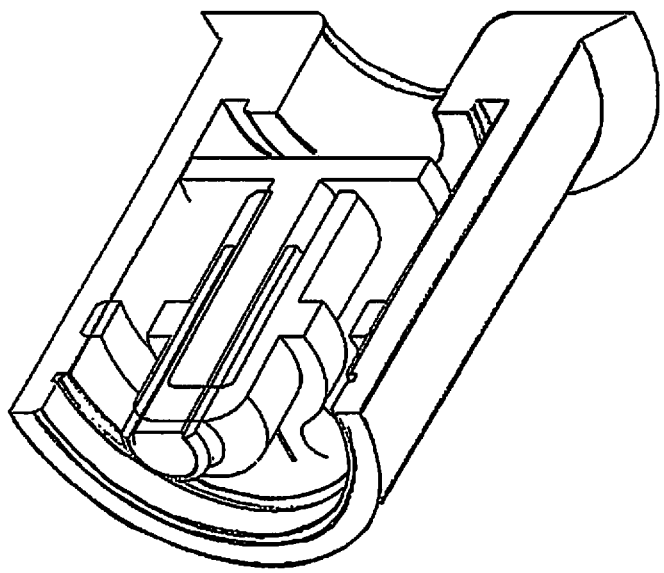
Figure 16:
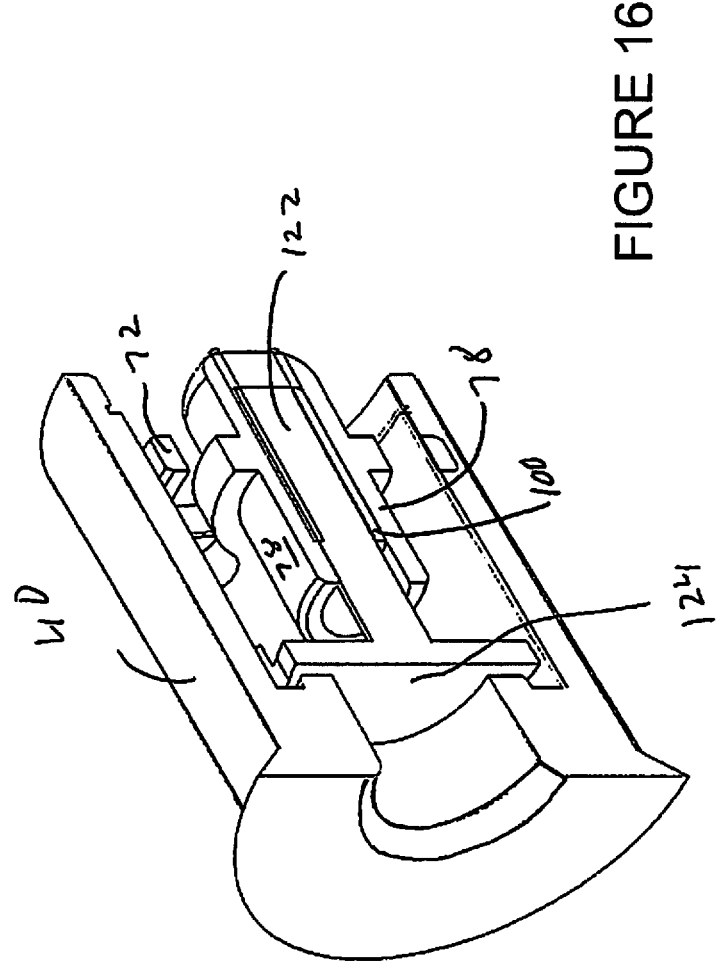

Body 40, as well as ring member 70 and impeller 120, can be preferably constructed from stainless steel, though such is not considered limiting, and other materials can be selected and are considered within the scope of the invention. A plurality of internal threads 58 can be provided in body 40 at second end 44. An internal groove 60 can also be provided in body 40 adjacent to internal threads 58. An outer flange 62 depends outward from a portion of outer surface 46. As seen from FIGS. 2, 11 and 12, the location of outer flange 62 along outer surface 46 depends on the type of water distribution system 150 in use, including the location of water meter 160 and pipe coupling locations 161 for water distribution system 150. As seen in FIG. 1, when positioning valve 20 within water distribution system 150, the location of pipe coupling 161 and water meter 160 determine which flange 62 location for valve 20 to use. To maintain valve 20 in the desired position within water distribution system 150, outer flange 62 can be sandwiched between two adjacent pipe ends and then pipe coupling, sleeve, or other pipe securement mechanism 161 is secured to maintain the pipes together, with valve 20 in place within water line 151 of water distribution system 150.

As seen in FIG. 1, valve is 20 is position after water meter 160 and in between water meter 160 and building 170 (e.g. house, office building, etc.) that is associated with water member 160. Preferably, the outer diameter of body 40 is chosen to correspond to or be virtually the same as the inner diameter of the pipe 151 of water distribution system 150 to which it is position within to provide for a water tight/sealed or virtually water tight/sealed connection between valve 20 and pipe 152. This causes the water flowing through water line 151 of water distribution system 150 to be directed into first passageway segment 50 at the point where valve 20 is positioned within pipe 151.

Where outer flange 62 is located at first end 42 of body 40 it also helps to direct the flowing water into first passageway segment 50. The other locations of flange 62 also help to block water from flowing between valve 20 and pipe 152. Preferably, body 40 comprises a one piece body member.

Ring member 70 comprises a base or circular portion 72 having one or more threads 76 on its outer perimeter end 74 and a housing portion 78 extending outward from circular portion 72. Preferably, circular portion 72 and housing portion 78 are monolithically formed as a one-piece member, though such is not considered limiting. In use, ring member 70 is disposed within body 40 primarily within second passageway segment 52 and maintained in a fixed position through the mating of threads 76 on circular portion 70 with internal threads 58 of second passageway segment 52. For smaller valve diameters, such as, but not limited to 2" and smaller, a locking ring, preferably constructed from metal, though such is not considered limiting, can be disposed within groove a 60. The locking ring/groove, is provided since with the smaller pipe sizes there often is not enough internal wall space inside the body of valve 20 to create threads. The locking ring/groove can also be used with larger pipe sizes in addition to a threaded connection. Where the locking ring/groove is provided in lieu of threads, circular portion 70 abuts up against the locking ring to maintain ring member 70 in place. Circular portion 72 can be provided with one or more cutouts 73 which will permit water flowing within valve 20 to exit out of second end 44 of body 40 when ring member 70 is secured within body 40.

A plug member, which can be a hushing 100, though such is not considered limiting, can be disposed within housing portion 78 of ring member 70. In a preferred embodiment bushing 100 can be constructed from a Vesconite material or other thermoplastic material made from internally lubricated polymers, though such is not considered limiting and others materials can be used for constructing bushing 100 and are considered within the scope of the invention. Bushing 100 has a first end 102 and a second end 104 and can be provided with an internal passageway 106 extending therethrough from first end 102 to second end 104. It is also within the scope of the invention that plug member 100 has a cutout or opening for receipt of the impeller member described below, with the cutout or opening not necessarily extending all the way from the first end of the plug member to the second end of the plug member. The cutout or opening can begin at the first end of the plug member but can terminate at some intermediate point within the plug member and does not reach the second end of the plug member in this alternative plug embodiment. The inner diameter of an internal area 79 of housing portion 78 can be virtually or nearly the same as an outer diameter of bushing 100, such that bushing 100 is snugly received and maintained within internal area 79 of housing portion 78. The length of housing portion 78 can be the same or larger than the length of bushing 100 such that entire bushing 100 can be preferably snugly received and maintained within housing portion.

Impeller 120 comprises a shaft member 122 and a head portion 124 disposed at a first end 126 of shaft member 122. Shaft member 122 also has an opposite second end 128. Preferably, shaft member 122 and head portion 124 are monolithically formed as a one-piece member, though such is not considered limiting. The outer diameter of shaft diameter can be virtually or nearly the same as the diameter of passageway 106 or the plug cutout/opening such that a portion of shaft member 122, beginning at second end 128, is snugly received by the plug member and disposed within passageway 106 (or plug cutout/opening) of bushing 100, though shaft 122 will have some ability to move within passageway 106 and housing portion 78, such that impeller 120 will be permitted to move within body 40 for opening and closing valve 20, which will be discussed in more detail below. The tightness of the snug relationship between shaft member 122 and plug member 100 can be chosen based on the pressure of the water traveling within the fluid line. The tighter the connection the higher the friction and thus the higher the water pressure will have to be in order for impeller 120 to overcome the friction and move within valve 20.

Figure 6:
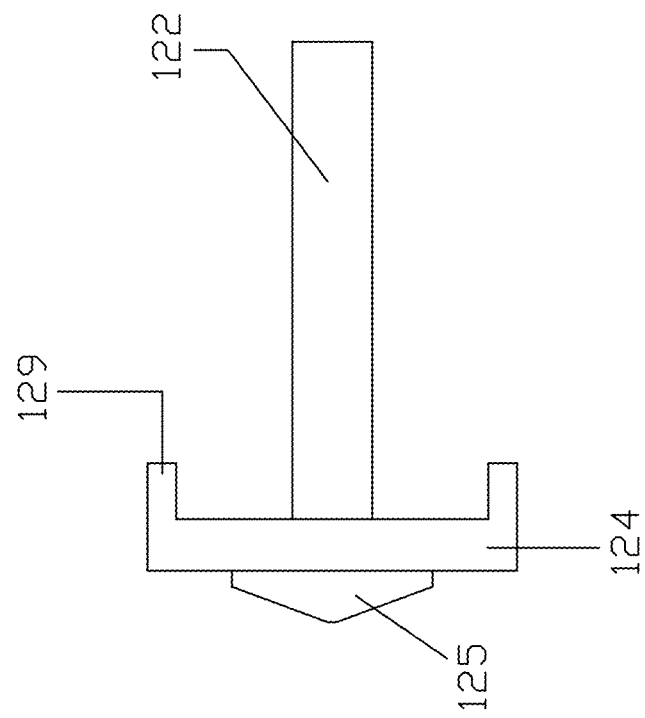
FIG. 6 is a side sectional view of the alternative impeller member of FIG. 5.
Figure 5:
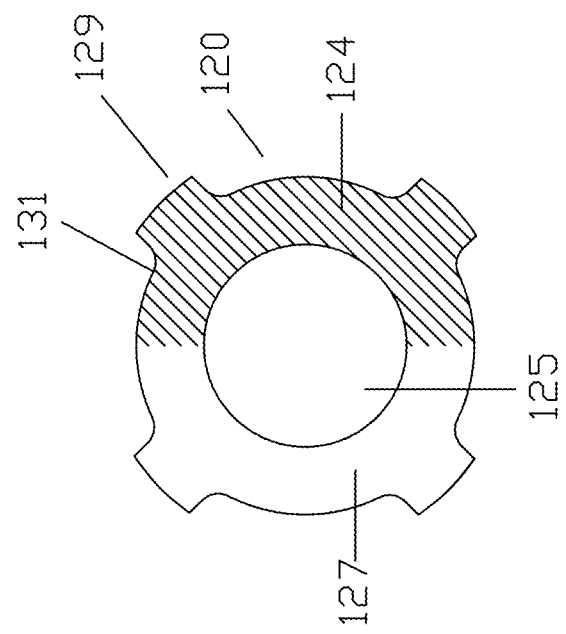
FIG. 5 is a from elevational view of an alternative impeller member for the water flow valve.

Impeller head portion 124 can be provided with a crown 125 which helps to accelerate and direct water flow through body 40, as well as lessen the turbulence of water flowing through body 40. As best seen in FIGS. 3 and 5, head portion 124 can comprise a circular or substantially circular area 127 having a certain diameter and one or more protrusions 129 extending outward from the perimeter of circular area 127 to define water flow passages 131 when valve 20 is in an open position, which will also be discussed in more detail below. As seen in FIGS. 4 and 6, protrusions 129 can also continue to extend downward from head portion 124 and substantially parallel to shaft 122. The diameter of circular area 127 can be larger than the diameter of first passageway segment 50 and smaller than the diameter of second passageway segment 52. As such, during its movement within body 40, impeller 120 is restricted from any further movement, once circular area 127 contacts or abuts ledge 54, which acts as a stop member for any further movement of impeller 120 in the direction of first end 42. In this position, valve 20 is in a closed position, as the contact of circular area 127 with ledge 54 effectively seals off first passageway segment 50 from second passageway segment 52. As the diameter of circular area 127 is smaller than the diameter of second passageway segment 52, when circular area 127 is not in contact with ledge 54 (open position for valve 20), water travel through water distribution system 150 into valve 20 contacts impeller 120 (and crown 125 if provided on circular area 127) and is then directed through water flow passages 131 into second passageway segment 52 and out of passageway 48 and body 40 through cutouts 73 in ring member 70.

In use, valve 20 is placed within water distribution system 150 near or adjacent to water meter 160 and in between water meter 160 and the dwelling/building for which water meter 160 is associated with. Thus, valve 20 can be preferably located downstream of meter 160 as water first enters meter 160 and then enter valve 20 after exiting from meter 160. Though not considered limiting, valve 20 can be placed within a foot of meter 160. As mentioned above, valve 20 is placed within system 150 to improve the accuracy of the measurements/readings obtained by meter 160. It is known that in addition to pressurized water (the intended fluid) traveling in the water distribution system 150, often air or other gas bubbles are formed or trapped in the water along their travels from one or more reasons, which are not germane for purposes of the invention. These air or gas bubbles consume volume and cause meter 160 to believe that a larger volume of water has flowed through meter 160, as compared to the volume of pressurized water that has actually flowed through meter 160. Believing that a larger volume of pressurized water has been used, the owner of the dwelling/building is billed a higher amount by the water facility providing the water.

If the pressure of the fluid exiting meter 160 and entering into first passageway segment 50 exerts enough of a force on impeller head 124, impeller 120 will travel towards second end 44 of body 40 such that impeller bead 124 no longer contacts ledge 54 thus causing valve 20 to be in an open position and allowing water to pass by impeller head 124 through passages 131 and travel through valve 20 and to its residence/building destination (See FIGS. 13-16).

The location of valve 20 just pass meter 160 allows the contact of the water against impeller head 124 to creates a back pressure which collapses/breaks or reduces the size of a significant amount, if not most, of the air bubbles, at the point in water distribution system 150 where they would be read by meter 160. Thus the amount of air volume in the water is significantly reduced as the meter takes a reading of the water, and provides a more accurate reading of the actual volume of water traveling through meter 160. If the air bubbles regenerate after the water has passed through 160 and valve 20, to again increase the air volume in the water, such affect does not affect the meter reading, as such water has already passed by meter 160. Though, valve 20 could be placed before meter, such is not preferred, as the point of the back pressure being further away from meter 160, could allow some air bubbles to form again in the water prior to reaching meter 160 and thus causing meter 160 to provide an inaccurate reading or an amount higher than had valve 20 been placed after meter 160. Even after valve 20 is in open position, the back pressure affect is created, since the water continued to contact impeller head 124, prior to be directed through water flow passages 131 at the perimeter of impeller head 124.

Accordingly, by positioning valve 20 in water distribution system 150, preferably after meter 160, valve 20 compresses the air into the water, thus making meter 160 read less volume when the water passes through. As mentioned above, valve 20 works by creating a back pressure in the line of water distribution system 150. With this increase pressure, the air bubbles in the water begin to collapse and occupy less space. When they pass through meter 160 in this state, meter 160 detects or reads only the water volume and ignores the air volume in the water. Thus, the water bill generated from readings by meter 160 will be lower, as compared to if no valve 20 had been disposed within the water distribution system 150.

Once the users in the buildings turn off the faucets, spickets, etc. water eventually stops flowing through water distribution system 150 towards the building, and a back flow of water will result which enters valve body 40 through second outlet end 44 and contact the non cutout portion of circular portion 72 of ring member 70 and/or impeller head 124 (i.e. the opposite sides of circular portion and impeller head from that described above) moving shaft member 122 towards first inlet end 42 of valve body 40 until impeller head 124 contacts ledge 54 (which acts as a stop member). At this point valve 20 is again in a "closed" position and remains in such position until a demand or request for water is made from the building (i.e. someone turns the water knob, etc.). With the request made, if the water traveling, through the water line of water distribution system 150 travels at a pressure exceeding the set level from the snug relationship of shaft member 122 and bushing 100, impeller head 124 moves away from ledge 54 and valve 20 is again in an "opened" position, and the contact of the water with impeller head 124 creates the back pressure in the water line to collapse the air bubbles.

Figure 17:
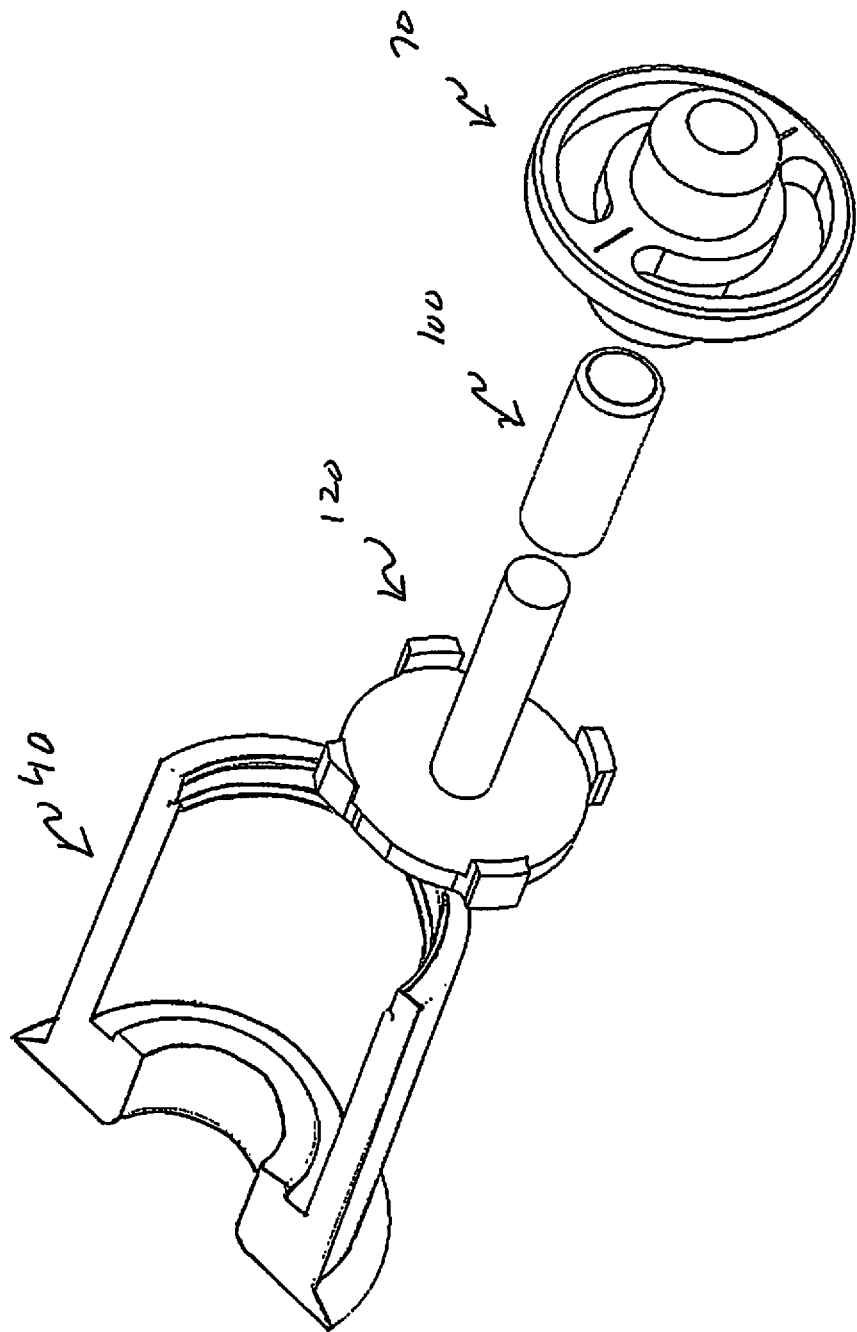
FIG. 17 illustrates an exploded perspective view of the present invention valve.

FIGS. 13-16 show valve 20 in sectional views and the interplay amongst the components in a valve "opened" position and/or in valve closed position. FIG. 17 is an exploded view of the preferred embodiment for the present invention valve. As seen in FIG. 17 and the other drawings figures, preferably, valve 20 is springless and does not used a spring to maintain the impeller head in a "closed" position.

The present invention also entails a novel billing system and method based on information received regarding the water usage at the building where the present invention is to be installed and/or other building characteristics. Initially, as part of the information gathering process, a form can be provided to the building owner/manager, etc. requesting one or more of the following information: 2+ years of water and sewer bills (though not limiting and the time period can be smaller or larger), occupancy rates if multi-family or some other consistent indicator measure such as units of production, pounds processed (industrial laundry), sizing of pipe connected to water meter, etc. as well as pictures of the water meters as well as the details about the meters including, but not limited to, make model, PSI and status of bolts, conditions etc. The information can also be gathered by other means, and is not required to be provided by filling out a form. The information can be used for properly manufacturing the calibration system for that particular location as well as developing an objective line of measurement to be paid on in view of the shared savings program created with use of the present invention.

The water and sewer consumption can be analyzed by each billing period (typically monthly, though not limiting, and can be also bi-monthly or quarterly) for creating an analysis of the consumption per occupied unit per day. Some of the factors that can be used for the analysis include, but are not limited to, the rate of occupancy, time or month of the year, the length of the billing, period, etc. Even if the bill is monthly, the bill could be and typically does range anywhere from 27-35 days. By preferably using at least 2+ years, trends can be determined and allows for a fair average to be produced. Temperature, pools, landscaping, occupancy can also affect the water consumption and can also be included in the analysis. Preferably, irrigation meters are not included unless they are not separate from the "domestic" water lines, though such is not considered limiting.

The analysis can also include the rate structure for the specific property where installation of the present invention is to occur. Some areas have high fixed charges where whether consumption is 1,000 gallons or 10,000 gallons; it is the same flat fee billing. In these situations, the installation of the present invention which provides a better more accurate measurement of actual water consumption (i.e. reducing water from 7500 gallons to 5,000 gallons) may not provide any real dollar savings to the property owner as the billing, would be the same either way (i.e. flat fee). However, the present invention still permits for accurate measurements of water consumption to be provided, which may be used for other purposes.

As a non-limiting example of the savings provided by use of the present invention and how to determine what the building owner should pay for use of the present invention, an apartment building has 100 units and in a 30 day billing period for October 2011 used 800,000 gallons of water; the building is 80% occupied (80 units) and the water and sewer rate is $7.00/1000 gallons. The example assumes no fixed charges. Therefore, the water bill will be 800,000 gallons/1000×7.00 or $5600.00 for that particular month. The present billing formulas break the amount down further to a per day basis per unit in order to provide exactly the use per occupied unit per day. That calculation is 800,000 divided by 30 days divided by 80 occupied units or 333.33 gallons per day per occupied unit. This number provides a baseline for this particular period and assumes there was only one year of bills etc. for that particular month. Where more than one year of bills are provided, the present invention billing/baseline system preferably averages the bills together to arrive at a baseline.

As another non-limiting example, assume an installation of present invention on Oct. 1, 2012 and receiving a billing for 34 days and the consumption was 680,000 gallons, occupancy was 85% (85 units) now and the rate was the same at $7.00/1000 gallons. The bill would be for: 680,000/1000×7.00 or $4760. One interpretation could be that the use of the present invention helped save $840.00 (5600−4760, a savings of 15% (840/5600)). However, for a more accurate showing the use per occupied unit per day provides a much truer measurement. This calculation is 680,000 divided by 34 divided by 85 or 235.29 gallons per unit saving 98.04 gallons per day per occupied unit. Therefore the savings is actually 98.04/33133 or 29%. With a preferred shared savings program implemented with the building owners, the customer can be billed for a percentage of the savings (i.e.: 50%, etc.). In the current example, the system can be designed as follows:

98.04 gallons reduction×34 days×85 units or 283,336 gallons at 7.00/1000 or 1983.35 divided by 2 (50%) for a bill to the customer $991.67. This bill is independent of the water bill received by the consumer. However, with the use of the present invention, the combined amount of the consumer bill of $991.67 and the consumer's water bill for the month will be lower than the water bill the consumer would have received from the water company if the present invention was not installed. The above methodology is the preferred billing method for use of the present invention as it provides the fairest and most accurate way to measure and share the savings along with the consumer. Additionally after installation and to confirm the billing, weekly (or other time period) meter readings can be provided (such as 4 weeks worth, though not limiting) to permit tracking and evaluation of the present invention performance, as opposed to waiting for the actual water bill to arrive. This provides a strong indication of the savings that will be achieved through use of the present invention and thereafter confirmed by the billing from the respective water and sewer utility.

The above method can be accomplished through computer program stored and running on a computer where the above measurements (i.e. water usage, occupancy rate, number of days for the billing period, billing rate, etc.—before and after installation of the present invention) are entered into the program and the software program calculates the amount of savings that should be realized through the use of the present invention.

All locations, sizes, shapes, proportions, measurements, amounts, angles, component locations, part locations, fasteners, configurations, weights, dimensions, values, percentages, ranges, materials and/or orientations discussed above or shown in the drawings are merely by way of example and are not considered limiting and other locations, sizes, shapes, proportions, measurements, amounts, angles, component locations, part locations, fasteners, configurations, weights, dimensions, values, percentages, ranges, materials and/or orientations can be chosen and used and all are considered within the scope of the invention.

Dimensions of certain parts as shown in the drawings may have been modified and/or exaggerated for the purpose of clarity of illustration and are not considered limiting.

Unless feature(s), part(s), component(s), characteristic(s) or function(s) described in the specification or shown in the drawings for a claim element, claim step or claim term specifically appear in the claim with the claim element, claim step or claim term, then the inventor does not considered such feature(s), part(s), component(s), characteristic(s) or function(s) to be included for the claim element, claim step or claim term in the claim for examination purposes and when and if the claim element, claim step or claim term is interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

While the invention has been described and disclosed in certain terms and has disclosed certain embodiments or modifications, persons skilled in the art who have acquainted themselves with the invention, will appreciate that it is not necessarily limited by such terms, nor to the specific embodiments and modification disclosed herein. Thus, a wide variety of alternatives, suggested by the teachings herein, can be practiced without departing from the spirit of the invention, and rights to such alternatives are particularly reserved and considered within the scope of the invention.

What is claimed is:

1. A water flow valve disposed within a water distribution system for reducing the amount of air volume in water prior to the water being read by a water meter disposed within the water distribution system, said water flow valve comprising:
   a valve body member having a first end and a second end and an internal passageway extending from the first end to the second end, said internal passageway having a first passageway portion having a first diameter and a second passageway portion having a second diameter, wherein the first diameter is smaller than the second diameter to create a ledge at a point within said internal passageway where the first passageway portion and the second passageway portion meet;
   a ring member having a base portion and a housing portion extending outward from said base portion, said base portion having a perimeter surface and one or more cutouts, said ring member secured in a fixed position within said second passageway portion of said valve body, said housing portion defining an opening having a uniformed diameter from a first end to a second end;
   a plug member having a first end and a second end and disposed within the housing portion of said ring member and consuming a substantial portion of the opening defined by said housing portion, said plug member having an outer diameter smaller in size than the uniformed diameter of the opening defined by the housing portion;
   an impeller member having a shaft portion and a impeller head disposed at a first end of said shaft portion, a second end of said shaft portion snugly received by said plug member within said housing portion of said ring member, said impeller head having a central portion and a plurality of protrusions extending outward from a perimeter of said central portion to define a plurality of flow passages between said plurality of protrusions;
   wherein the snug relationship between said shaft portion and said plug member establishes a threshold water pressure level which must be met in order to move the shaft member towards the second end of said valve body and permit communication between the first passageway portion and the second passageway portion;
   wherein in a valve "closed" position, said impeller head is maintained in contact with said ledge to seal of communication between said first passageway portion and said second passageway portion by the snug relationship between the shaft portion and the plug member and without any compression spring;
   wherein in a valve "opened" position water traveling within the water distribution system meets or exceeds the threshold water pressure level and upon contact of said water with the impeller head said shaft member is moved towards the second end of said valve body to permit the water to travel through said first passageway portion and through the water flow passages and the cutouts disposed within said second passageway portion and out of said valve body;
   wherein the contact of the water with the impeller head creates back pressure in the water distribution system which collapses or compresses a substantial number of air bubbles in the water such that an amount of air volume read by a meter is reduced.

2. The water flow valve of claim 1 wherein said valve body having an outer diameter and a pipe portion of said water distribution system where said valve body is disposed within having an inner diameter wherein the outer diameter of the valve body and the inner diameter of the pipe portion are chosen such that valve body is snugly received within the pipe portion to prevent or reduce water from traveling around the valve body as opposed to through the valve body.

3. The water flow valve of claim 1 wherein said plug member having a passageway extending from the first end of said plug member to said second end plug member, wherein a portion of the shaft member is received within said plug passageway.

4. The water flow valve of claim 1 wherein said valve body having an outer flange extending outward from an outer surface of said valve body for maintaining said valve body in position within the water distribution system.

5. The water flow valve of claim 1 wherein said valve body is positioned within said water distribution system near or adjacent to a water meter associated with a building and between the water meter and the building.

6. The water flow valve of claim 1 wherein a portion of an inner surface of said second passageway portion is threaded at the second end of said valve body and said perimeter surface of said base portion is threaded and said ring, member is fixedly secured within said second passageway portion by mating, the threads of said perimeter surface with the threads on the inner surface of said second passageway portion.

7. The water flow valve of claim 1 wherein a first inlet end of said first passageway portion having a rounded edge to facilitate water flow into said first passageway portion.

8. The water flow valve of claim 1 wherein said plug member is a bushing constructed from a VESCONITE material.

9. The water flow valve of claim 1 wherein the backpressure continues to be created as the water contacts the impeller head in a valve "opened" position.

10. The water flow valve of claim wherein said impeller further comprising a crown portion disposed on the impeller head to facilitate water flow.

11. The water flow valve of claim 5 wherein the back pressure collapses or compresses the air bubbles in the water prior to the water traveling through the water meter.

12. A water flow valve disposed within a water distribution system for reducing the amount of air volume in water prior to the water being read by a water meter disposed within the water distribution system, said water flow valve comprising:
a valve body member having a first end and a second end and an internal passageway extending from the first end to the second end, said internal passageway having a first passageway portion having a first diameter and a second passageway portion having a second diameter, wherein the first diameter is smaller than the second diameter to create a ledge at a point within said internal passageway where the first passageway portion and the second passageway portion meet;
a ring member having a base portion and a housing, portion extending outward from said base portion, said base portion having a perimeter surface and one or more cutouts, said ring member secured in a fixed position within said second passageway portion of said valve body, said housing portion defining an opening, having a uniformed diameter from a first end to a second end;
a plug member having a first end and a second end and disposed within the housing portion of said ring member and consuming a substantial portion of the opening defined by said housing portion, said plug member having an outer diameter smaller in size than the uniformed diameter of the opening defined by the housing portion, said plug member having a passageway extending from the first end of said plug member to said second end plug member;
an impeller member having a shaft portion and a impeller head disposed at a first end of said shaft portion, a second end and portion of said shaft portion disposed and received within said plug passageway such that said impeller member is snugly received by said plug member within said housing portion of said ring member, said impeller head having a central portion and a plurality of protrusions extending outward from a perimeter of said central portion to define a plurality of flow passages between said plurality of protrusions;
wherein the snug relationship between said shaft portion and said plug member establishes a threshold water pressure level which must be met in order to move the shaft member towards the second end of said valve body and permit communication between the first passageway portion and the second passageway portion;
wherein in a valve "closed" position, said impeller head is maintained in contact with said ledge to seal off communication between said first passageway portion and said second passageway portion by the snug relationship between the shaft portion and the plug member and without any compression spring;
wherein in a valve "opened" position water traveling within the water distribution system meets or exceeds the threshold water pressure level and upon contact of said water with the impeller head said shaft member is moved towards the second end of said valve body to permit the water to travel through said first passageway portion and through the water flow passages and the cutouts disposed within said second passageway portion and out of said valve body;
wherein the contact of the water with the impeller head creates back pressure in the water distribution system which collapses or compresses a substantial number of air bubbles in the water such that an amount of air volume read by a meter is reduced;
wherein the backpressure continues to be created as the water contacts the impeller head in a valve "opened" position;
wherein said valve body is positioned within said water distribution system near or adjacent to a water meter associated with a building and between the water meter and the building such that the back pressure collapses or compresses the air bubbles in the water prior to the water traveling through the water meter.

13. The water flow valve of claim 12 wherein said valve body having an outer diameter and a pipe portion of said water distribution system where said valve body is disposed within having an inner diameter wherein the outer diameter of the valve body and the inner diameter of the pipe portion are chosen such that valve body is snugly received within the pipe portion to prevent or reduce water from traveling around the valve body as opposed to through the valve body.

14. The water flow valve of claim 12 wherein said valve body having an outer flange extending outward from an outer surface of said valve body for maintaining said valve body in position within the water distribution system.

15. The water flow valve of claim 12 wherein a portion of an inner surface of said second passageway portion is threaded at the second end of said valve body and said perimeter surface of said base portion is threaded and said ring member is fixedly secured within said second passageway portion by mating the threads of said perimeter surface with the threads on the inner surface of said second passageway portion.

16. The water flow valve of claim 12 wherein a first inlet end of said first passageway portion having a rounded edge to facilitate water flow into said first passageway portion.

17. The water flow valve of claim 12 wherein said plug member is a bushing constructed from a VESCONITE material.

18. The water flow valve of claim 12 wherein said impeller further comprising a crown portion disposed on the impeller head to facilitate water flow.

19. A springless water flow valve disposed within a water distribution system for reducing the amount of air volume in water prior to the water being read by a water meter disposed within the water distribution system, said water flow valve comprising:
a valve body member having a first end and a second end and an internal passageway extending front the first end to the second end, said internal passageway having a first passageway portion having a first diameter and a second passageway portion having a second diameter, wherein the first diameter is smaller than the second diameter to create a ledge at a point within said internal passageway where the first passageway portion and the second passageway portion meet, a portion of an inner surface of said second passageway portion is threaded at the second end of said valve body;

a ring member having a base portion and a housing portion extending outward from said base portion, said base portion having a threaded perimeter surface and one or more cutouts, said ring member secured in a fixed position within said second passageway portion of said valve body by mating the threads of said perimeter surface with the threads on the inner surface of said second passageway portion said housing portion defining an opening having a uniformed diameter from a first end to a second end;

a plug, member having a first end and a second end and disposed within the housing portion of said ring member and consuming a substantial portion of the opening defined by said housing portion, said plug member having an outer diameter smaller in size than the uniformed diameter of the opening defined by the housing portion, said plug member having a passageway extending from the first end of said plug member to said second end plug member, said plug member constructed from a VESCONITE material;

an impeller member having a shaft portion and a impeller head disposed at a first end of said shaft portion, a second end and portion of said shaft portion disposed and received within said plug passageway such that said impeller member is snugly received by said plug member within said housing portion of said ring member, said impeller head having a central portion and a plurality of protrusions extending outward from a perimeter of said central portion to define a plurality of flow passages between said plurality of protrusions, said impeller further comprising a crown portion disposed on the central portion of said impeller head to facilitate water flow;

wherein the snug relationship between said shaft portion and said plug member establishes a threshold water pressure level which must be met in order to move the shaft member towards the second end of said valve body and permit communication between the first passageway portion and the second passageway portion;

wherein in a valve "closed" position, said impeller head is maintained in contact with said ledge to seal off communication between said first passageway portion and said second passageway portion by the snug relationship between the shaft portion and the plug member and without any compression spring;

wherein in a valve "opened" position water traveling, within the water distribution system meets or exceeds the threshold water pressure level and upon contact of said water with the impeller head said shaft member is moved towards the second end of said valve body to permit the water to travel through said first passageway portion and through the water flow passages and the cutouts disposed within said second passageway portion and out of said valve body;

wherein the contact of the water with the impeller head creates back pressure in the water distribution system which collapses or compresses a substantial number of air bubbles in the water such that an amount of air volume read by a meter is reduced;

wherein the backpressure continues to be created as the water contacts the impeller head in a valve "opened" position;

wherein said valve body is positioned within said water distribution system near or adjacent to a water meter associated with a building and between the water meter and the building such that the back pressure collapses or compresses the air bubbles in the water prior to the water traveling through the water meter.

20. The springless water flow valve of claim 19 wherein said valve body having an outer diameter and a pipe portion of said water distribution system where said valve body is disposed within having an inner diameter wherein the outer diameter of the valve body and the inner diameter of the pipe portion are chosen such that valve body is snugly received within the pipe portion to prevent or reduce water from traveling around the valve body as opposed to through the valve body.

21. The springless water flow valve of claim 19 wherein said valve body having an outer flange extending outward from an outer surface of said valve body for maintaining said valve body in position within the water distribution system.

22. The springless water flow valve of claim 19 wherein a first inlet end of said first passageway portion having a rounded edge to facilitate water flow into said first passageway portion.

* * * * *